United States Patent [19]

Noback

[11] Patent Number: 4,631,411
[45] Date of Patent: Dec. 23, 1986

[54] RADIATION MEASURING APPARATUS AND METHOD

[75] Inventor: Charles V. Noback, Cresskill, N.J.

[73] Assignee: Nuclear Research Corp., Warrington, Pa.

[21] Appl. No.: 683,666

[22] Filed: Dec. 19, 1984

[51] Int. Cl.⁴ .............................................. G01T 1/18
[52] U.S. Cl. .................................... 250/374; 250/375; 250/386
[58] Field of Search ........................ 250/374, 375, 386

[56] References Cited

U.S. PATENT DOCUMENTS

| | | | |
|---|---|---|---|
| 2,858,448 | 10/1958 | Brown et al. | 250/374 |
| 4,260,892 | 4/1981 | Kovacs et al. | 250/374 |
| 4,453,076 | 6/1984 | Jackson et al. | 250/374 |

FOREIGN PATENT DOCUMENTS 2080944 7/1981 United Kingdom ................ 250/374

Primary Examiner—Alfred E. Smith
Assistant Examiner—Richard Hanig
Attorney, Agent, or Firm—Walter B. Udell

[57] ABSTRACT

The invention substantially eliminates measurement errors in radiation field strength due to circuit propagation time delays and slow drift conditions, Geiger-Mueller tube turn-on time and response curve variations, and the need to manually calibrate the measurement apparatus in high radiation fields to compensate for time errors. The exponential probability function has the property that the expected value for the arithmetic mean of any right hand segment of the curve is always the same provided that the axis is adjusted so that the starting point of the selected segment is zero. The curve is trimmed dynamically each time a new rate is calculated. An individual count of strike events is kept for N separate but consecutive time units, and the counts for the later occurring events are lumped together as the Main Event. After the data collection period ends, a total accumulated time and accumulated count are constructed. This construction begins by examining the Main Event data. If enough data is present to derive a statistically acceptable estimate (250-500 events) the data in the first N time units is ignored. If more data is desirable, the data is factored in, one time unit at a time starting backward from the event count corresponding to time unit with the longest time. The total time is now adjusted so that the starting time corresponding to the selected portion of the PDF is zero. An estimate for rate is made by dividing the total adjusted number of counts by the total adjusted accumulated time and multiplying by a scale factor.

20 Claims, 3 Drawing Figures

RADIATION MEASURING APPARATUS AND METHOD

FIELD AND BACKGROUND OF THE INVENTION AND PRIOR ART

This invention relates to the field of nuclear radiation measurement and is an improvement over the apparatus and method for radiation measurement disclosed and taught in the co-pending U.S. patent application of Elmo J. DiIanni, Harold J. Cooley, Michio Fujita and Charles Victor Noback, Ser. No. 562,985 filed Dec. 19, 1983, and assigned to the same assignee as the present patent application.

The co-pending application fully describes the background of the invention and the known prior art, and shows the derivation of the governing equations upon which the apparatus and method of that application are based using a Geiger-Mueller (G-M) tube radiation detector, such equations being $$R = K/T$$

where:
R is radiation field strength
T is the time to first strike after G-M tube enablement
K is a proportionality constant $$R_T = \frac{K \times \Sigma COUNTS}{\Sigma T_{ON}}$$

where:
$R_T$ is the radiation intensity over a defined time period
$\Sigma COUNTS$ is the number of strikes occurring during the defined time period
$\Sigma T_{ON}$ is the G-M tube "on time" to register each strike during the defined time period As disclosed in the co-pending application, the G-M detector is enabled by raising the bias voltage across the detector up into its active region and measuring the elapsed time interval thereafter to the occurrence of the first strike. Since the reciprocal of this time interval is proportional to the radiation field strength, as shown by the above equations, all information necessary to determine the field strength (R, $R_T$) has been obtained. A constant wait time is employed after each strike to assure that the G-M tube has fully recovered, and the G-M tube is then enabled and the process is repeated. Because of the random nature of nuclear phenomena, even though each timed interval to strike contains all of the necessary information to calculate the radiation field strength, the confidence level that any given measurement is an accurate representation of the true average field strength is low. Many measurements are therefore taken and combined for high confidence factors.

In the method according to the co-pending application an estimate of rate (field strength) is made at regular intervals (every two seconds). This is done in two stages. First, new data is collected which contains information about the number of strikes and the "times to strike". Then a new estimate of rate is calculated. The calculation is done in several steps. First, the total accumulated time is adjusted to correct for time to strike errors. Then, the total number of counts is divided by the total accumulated time. Following this a scale factor is then applied to compensate for the "N" factor of the Geiger-Mueller tube.

In high fields, errors in the measurement of time to strike become a problem. These errors creep in from several sources. One error is caused by measuring time in discrete steps which limits the time resolution. Other errors tend to inflate the value of the measured time to strike. Among the reasons for this increase in time are G-M tube turn-on delays and circuit propagation delays. The error can drift slowly over time and is somewhat different from one unit to the next. To help correct for this problem a time error constant is subtracted from each time to strike measurement. The value of this constant is read from external switches which can be set by the user. After the accumulated time has been adjusted for time to strike errors, calculations proceed as discussed above (total counts are divided by total accumulated time).

This method is summarized as follows.
Collect data:
(a) Keep count of total number of strikes
For each new strike:
TOTAL STRIKES = TOTAL STRIKES + 1
(b) Keep total of "time to strike" i.e. (total time G-M tube is ON).
For each new "time to strike":
TOTAL TIME = TOTAL TIME + "TIME TO STRIKE"
Calculate RATE:
(a) Adjust TOTAL TIME for errors in "time to strike" measurements
 (1) Read in TIME ERROR constant from switches.
 (2) ADJUSTED TIME = TOTAL TIME − (TOTAL COUNTS × TIME ERROR)
(b) RATE = TOTAL STRIKES/ADJUSTED TIME × SCALE FACTOR The foregoing described method, and the apparatus for implementing it, is a substantial improvement over the prior art but nevertheless is still subject to certain problem areas, particularly in very high radiation fields where the mean time to strike is very short, for example in the one microsecond region. These problems are:
(a) the need to manually calibrate the time error constant used to compensate for the time to strike error. This calibration requires an especially large radiation source and is frequently impractical.
(b) errors resulting from slow drift in the time to strike error during use.
(c) external hardware switches required to specify the time error constant.

SUMMARY OF THE INVENTION

When calculations use data where mean times are short (high rates), it is useful to view the calculation of the rate as an estimation of the mean time to strike, which in turn is equivalent to estimating the mean ($1/nR$) of an exponential probability distribution function (PDF) $nRe^{-nRt}$. This function has the fortuitous property that the expected value for the arithmetic mean of any right hand segment of the curve is always the same provided that the x-axis (in this case time) is adjusted so that the starting point of the selected segment is zero. This property corresponds to the invariance of the time constant for first order processes such as an RC discharge. This means that the first few microseconds from the sampled PDF where time errors occur can be trimmed off without adversely affecting the expected, or limit, value of the results. The price paid for this adjustment may be a slight loss in the signal to noise ratio of the estimate. This loss, if it occurs, is because the process of trimming the curve may include dropping off a few valid events. The technique makes the assumption that the circuit delay error and the overall radiation rate are reasonably constant over the 2 second rate measurement time period. In practice this assumption is generally correct.

The decision as to where to trim the curve is done dynamically each time a new rate is calculated. When done this way it is possible to compensate for slow changes in the delay time error (or differences from unit to unit) in a way that uses enough data to keep the statistics reasonably accurate in high fields where the technique is needed the most. More specifically, when individual events are collected, those occurring in the first N time units, say ten microseconds, are treated separately. An individual count of strike events is kept for each microsecond slot or bin (partial histogram). This time and count for the remaining events are lumped together as the Main Event. After the data collection period ends, a total accumulated time and accumulated count are constructed. This construction begins by examining the data generated by pulse events with strike times longer than 10 microseconds, that is, the Main Event data. If enough data is present to derive a statistically acceptable estimate (250-500 events) the histogram data in the first ten slots or bins is ignored. If more data is desirable, the histogram data is factored in, one bin at a time starting backward from the event count corresponding to the histogram bin with the longest time, I.E. bin 10. If the desired limit of several hundred counts is not reached, all events will be included. When this occurs the mean time is so large that short strike time errors become negligible.

The total time is now adjusted so that the starting time corresponding to the selected portion of the PDF is zero. This adjustment also includes a further fix. Approximately 0.45 microseconds for each event is added in to the total time. For example all events occurring between virtual time 0 and 1 are treated as 0.45 microseconds—those between 1 and 2 as 1.45 (etc.). The 0.45 compensates for the digital approximation of the continuous variable time. A fix of 0.50 corrects most of the error caused by the discrete clock frequency of 1 microsecond. The sub fix of 0.05 helps to adJust for additional curvature errors which are most pronounced when the mean time to strike is extremely short (where the mean time to strike is close to the clock time). The total time includes the time left on the timer counter when the data collection period ended even if no terminating event occurred. This effectively handles the condition which arises at zero or low counts without introducing any meaningful errors at higher fields. An estimate for rate is now made by dividing the total adjusted number of counts by the total adjusted accumulated time (ON time).

The method according to the invention is as follows. During each data collection period, for example two seconds, (1) Generate a partial histogram of "event count" vs. "event time" by storing an individual HISTOGRAM EVENT COUNT "C" for each possible EVENT BIN 1 to N ranging from "0" to N-ε microseconds where ε is vanishingly small. An EVENT TIME of "0" means a pulse event occurred in the time interval between "0" and 1 including "0" but not 1, which is bin 1. For example, if during a particular turn-on interval of the G-M tube a pulse event occurs with EVENT TIME=3, then add 1 to the HISTOG EVENT COUNT in bin 4. (1 event with event time 3).

HISTOG EVENT COUNT in bin 4→HISTOG EVENT COUNT in bin 4+1

(2) Maintain one MAIN EVENT COUNT and one MAIN EVENT ACCUMULATED TIME SUM for all pulse events with EVENT TIME'S equal to and greater than "N" microseconds. Whenever a pulse event occurs with EVENT TIME equal to or greater than "N", add 1 to the MAIN EVENT COUNT and add the EVENT TIME to the MAIN EVENT ACCUM. TIME SUM.

NEW MAIN EVENT COUNT=OLD MAIN EVENT COUNT+1

NEW MAIN EVENT ACCUM. TIME SUM=OLD MAIN EVENT ACCUM. TIME SUM+EVENT TIME (3) If the number of strikes in the Main Event at the end of the collection period has not reached the statistically acceptable number of events (I.E. 250-500) then add in the strike data in the partial histogram in reverse order starting with bin N until the statistically acceptable number of events is accumulated or all bins have been added in.

The value "N" can be changed. For example, it could be 10 microseconds with each bin being 1 μsec. Indeed block frequencies of 10 megaherz have been successfully utilized in measuring fields having mean times to strike of 100 nanoseconds. In general, the bin width is determined by the clock rate, and the clock rate is determined by, among other things, power consumption, chip speed, G-M tube, and design maximum field strength. Direct reading accuracies within 5%-10% have been achieved with this invention in fields on the order of 100,000 R, and direct reading accuracies of about 70% have been achieved in fields on the order of 350,000 R. These direct reading accuracies are further correctable by using a correction table.

It is a primary object of the invention to provide a novel method and apparatus for measuring the strength of nuclear radiation fields which substantially eliminates measurement errors due to circuit propagation time delays and Geiger-Mueller tube turn-on time variations.

Another obJect of the invention is to provide a novel method and apparatus for measuring the strength of nuclear radiation fields which substantially eliminates measurement errors due to the shape of the G-M tube response curve Just after tube turn-on before it stabilizes, and due to slow drift conditions in the circuitry during use.

A further object of the invention is to provide a novel method and apparatus for measuring the strength of nuclear radiation fields which eliminates the need to manually calibrate the measurement apparatus in high radiation fields to compensate for time errors, and thereby also eliminates the need for such calibration hardware.

The foregoing and other objects of the invention will become clear from a reading of the following specification in conjunction with an examination of the appended drawings, wherein.

Figure 1:
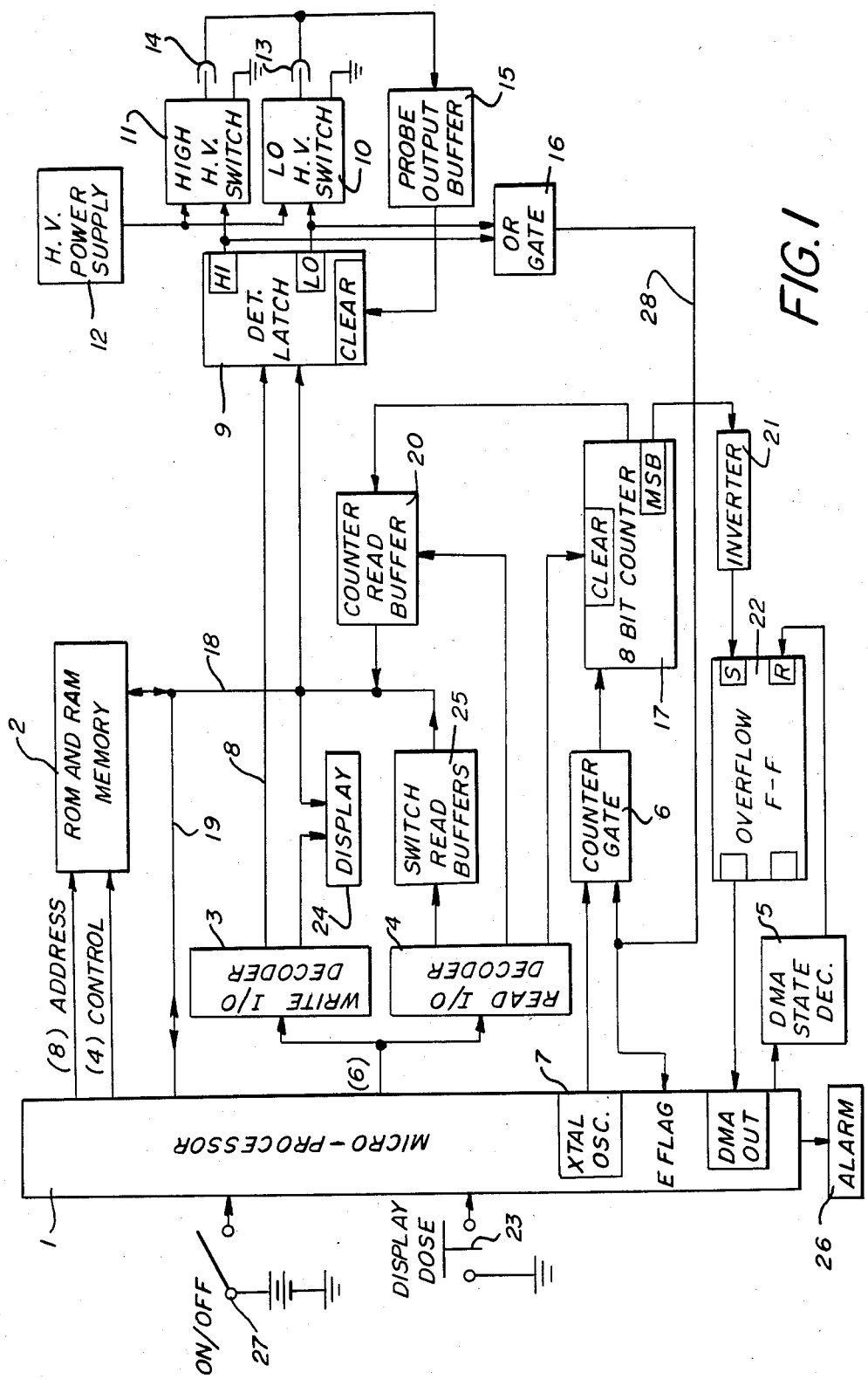
FIG. 1 is a functional block diagram of the overall apparatus according to the invention which carries out the novel method according to the invention.
Figure 2:
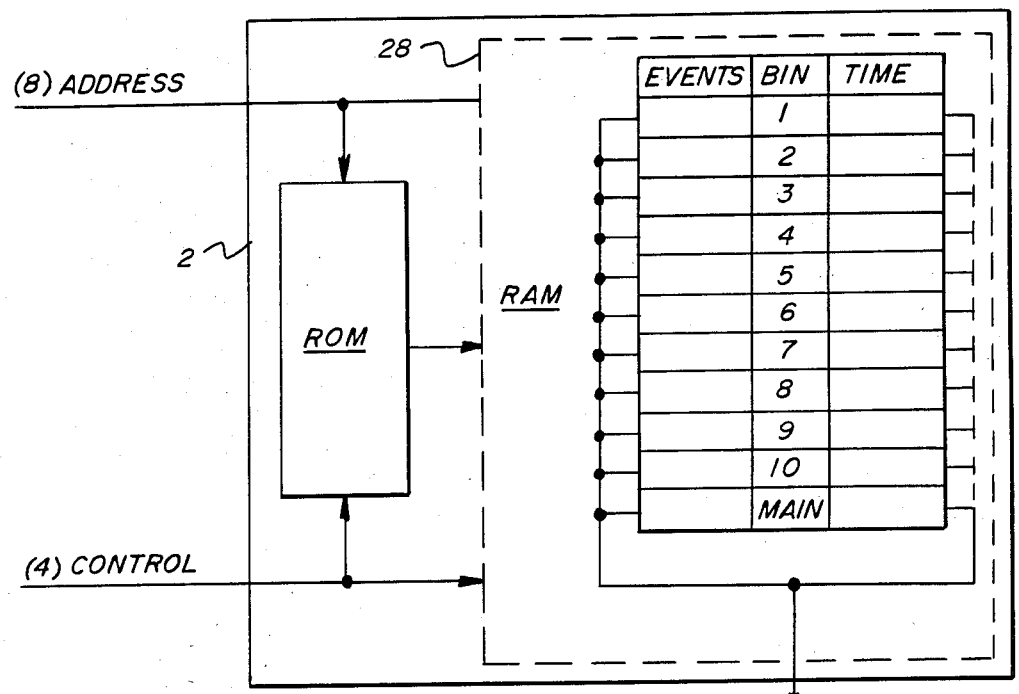
FIG. 2 is a functional block diagram showing an expanded part of the memory block 2 of the functional block diagram of FIG. 1.

Turning now to a consideration of the functional block diagrams of FIGS. 1 and 2 showing a radiation measuring apparatus which embodies the invention, there is seen a Micro-processor 1 which controls all of the operations of the apparatus through the other components, which include a ROM and RAM Memory 2, a Write I/O Decoder 3, a Read I/O Decoder 4, a DMA State Decoder 5, and a Counter Gate 6. The eight Address lines to the Memory 2 are multiplexed to function as sixteen lines. The Write I/O Decoder 3 tells the Detector Latch 9 and the Display 24 when to read data from the Data Bus 18. The Read I/O Decoder 4 selects when count data is read onto the Data Bus, and also clears the Counter 17 at the appropriate times.

The Memory EPROMs contain the Program and the RAM is used for transient data. As shown in FIG. 2 there is included in the RAM 28 discrete storage for the individual slots or bins of the partial histogram plus the Main Event storage. A crystal oscillator 7 provides one microsecond timing clock pulses to the Micro-processor 1 and to the Counter gate 6 for respectively timing the operations of the apparatus and the "time to strike". The oscillator circuitry is internal in the Micro-processor although the crystal is external.

The Micro-processor, through Write I/O Decoder 3, line 8, Detector Latch 9 and the Data Bus 18, selects which of the High Voltage switches 10 or 11 will be closed to apply voltage from Power Supply 12 through a capacitor to pulse bias G-M tube 13 or 14 for operation. The strikes detected by the G-M tubes are shaped by the Probe Output Buffer 15 and passed to the CLEAR input of the Detector Latch and drive the HI and LO outputs low to disable the active G-M tube by discharging it through the Switch. A pair of transistor switches provide the bias and discharge functions within each High Voltage Switch 10 and 11. When either of the HI or LO latch outputs is up, a signal is routed through OR Gate 16 to open the Counter Gate 6. When both HI and LO Latch outputs are down, the Counter Gate is closed. Accordingly, a strike closes the Counter Gate 6 and stops the count in the Counter 17. The Counter 17 receives and counts timing clock pulses through the Counter Gate 6 when the latter is open.

The eight line Data Bus 18, under control of the Micro-Processor 1, carries "count" information to the Memory 2, the count information also being routed via line 19 directly to the Micro-processor as it is being transmitted through Counter Read Buffer 20, and also routes information to Display 24 and to Detector Latch 9 which directs the Latch to enable or disable the High and/or LO High Voltage Switches. The Counter 17 via the Inverter 21 and Overflow Flip-flop 22 is used to signal the DMA (direct memory access) in the Micro-Processor upon the RESET of the most significant bit (MSB) in the 8 Bit Counter 17, a count of 256. After this information is dealt with internally in the Micro-Processor, a signal from the latter resets the Overflow Flip-flop 22 via the DMA State Decoder 5. This permits a 16 bit extension of the Counter 17 within the Micro-Processor without interrupting the Micro-Processor programming.

Two kinds of count information are displayable under control of the Micro-processor, namely, the radiation level being measured and the accumulated dose. When Display Dose switch 23 is actuated it causes the Micro-processor to signal Write I/O Decoder 3 to enable the Display 24 to decode the accumulated dose information when it is read out of the Memory 2 onto Data Bus 18, the decoded dose data passing into the Display 24, for visible display. When the Dose switch 23 is not actuated, the Write I/O Decoder 3 signals the Display 24 to decode the currently measured radiation level when that information is on the Data Bus from the Memory. The Switch Read Buffers 25 at the appropriate times, under control of the Micro-processor via Read I/O Decoder 4, place onto the Data Bus 18 scale factors corresponding to the "n" factors of the HI and LO range tubes. These switch read buffers 25 differ from those of the previously referred to co-pending United States application in that they do not include any means for inserting a correction factor to correct for circuit delay time. Alarm conditions are indicated by the Alarm 26, and the entire equipment is turned on and off by switch 27.

The Micro-processor operates on a defined time period, as for example two seconds, which is divided into a data processing time of for example 0.3 seconds followed by a data collection time of the remaining part of the two second cycle, or about 1.7 seconds. After power is turned on and the system is initialized, data collection begins. The Micro-processor 1 via Write I/O Decoder 3 and Detector Latch 9 generates an enable signal to the appropriate High Voltage Switch 10 or 11 which closes the switch and applies 550 volts D.C. from the H.V. Power Supply 12 to pulse bias the selected G-M Detector tube to detect radiation. The enable signal is passed through OR Gate 16 to open the Counter Gate 6 via line 28 and pass the clock pulSes to be counted In the counter 17 which has been cleared by a pulse from the Read I/O Decoder 4 as directed by the Microprocessor. This counting continues until the Detector Latch 9 is cleared either by a pulse from the Probe Output Buffer 15 which is generated by a radiation incident or by a signal from the Micro-processor after the two second Micro-processor defined time period expires. The clearing of the Detector Latch removes the enable output which sends a signal to the Micro-processor E flag input and also closes Counter Gate 6 terminating the transmission of clock pulses to the Counter 17.

Figure 3:
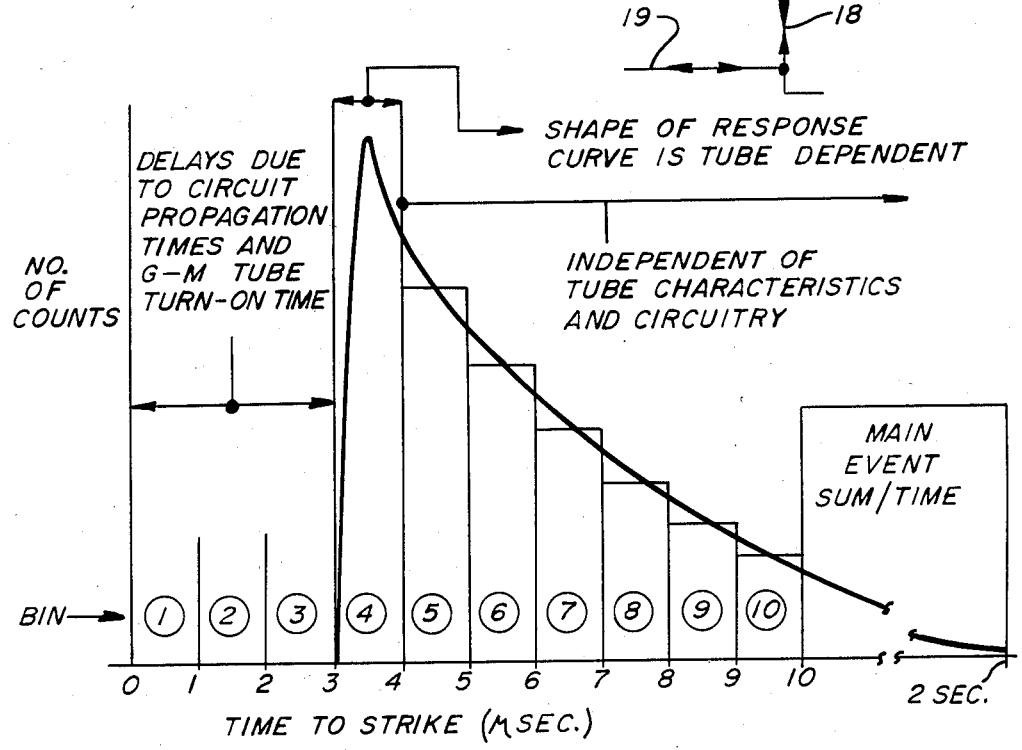
FIG. 3 is an illustration showing a typical histogram using a 3G10 Geiger-Mueller tube in a radiation field of typically 20,000 R having a mean time to strike of approximately four microseconds.

When the signal sent to the Micro-Processor E Flag input via line 28 tells the Micro-Processor that a "strike" has occurred but a data collection cycle has not been completed, the Micro-Processor starts counting to wait 1.5 milliseconds to insure that the G-M tube full recovery time has elapsed before sending another enable signal to the High Voltage switch to again pulse bias the G-M tube. During the same 1.5 millisecond time period the Microprocessor via the Read I/O Decoder 4 causes the time count information in the Counter 17 to be read through the Counter Read Buffer 20 onto the Data Bus 18 into the Memory 2 where it is routed to the RAM 28 and via line 19 to the Micro-processor. The Micro-processor via the Address and Control lines to the Memory 2 routes the strike event time count information into the appropriate Bin 1 to 10 or Main in accordance with the time count information. The actual time count is read into the Main Event bin for all strikes which fall into the Main Event time period, illustrated in FIG. 3 as being all times to strike equal to or greater than 10 microseconds. For all times to strike less than 10 microseconds it is only necessary to increment the event count in the corresponding bin, for example to increment bin 5 for a time to strike between 4 and 5 microseconds. The Microprocessor makes this determination and effects the appropriate incrementing.

After a data collection cycle (I.E. 1.7 seconds), the Micro-Processor disables the G-M tube via the Write I/O Decoder 3, the Detector Latch 9, and H.V. Switch, allows processing time (I.E. 0.3 seconds) including taking account of the scale factor from the Switch Read Buffers 25, and causes another signal to be sent to the High Voltage Switch via the Write I/O Decoder 3, the Detector Latch 9 and the Data Bus 18 to again pulse bias the G-M tube and start another data collection cycle.

This counting sequence is repeated and a weighted measurement is made in the Memory 2. This measure of the radiation present is normally displayed on the Liquid Crystal Display 24 except, as previously described, when the Display Dose Switch 23 is actuated. The Display is typically updated every two seconds. The Micro-processor will indicate an alarm condition through the Alarm 26 if the radiation present exceeds the alarm level programmed in Memory 2. This alarm could be audible or visual.

An operative program for the illustrated system is as follows for a measured time period data collection cycle controlled by the Micro-processor.

---
COLLECT DATA (1) Initialize for data collection by zeroing intermediate sums. (data relating to bins and Main Event)
(2) Acquire data.
BEGIN
  (a) Reset 24 bit Hardware/software counter timer to zero.
  (b) Enable appropriate detector (HIGH or LOW range).
  (c) Wait for (c1) GEIGER PULSE or (c2) CALCULATION timeout flag.
    (c1) WHEN GEIGER PULSE
    Read in EVENT TIME and update appropriate sums.
    (Main sum or bin)
    Wait out geiger tube DEAD TIME
    If no CALC. TIME OUT FLAG, go to (2)(a).
    If CALC. TIME OUT FLAG go to data calc. (3).
  (c2) WHEN CALCULATION time-out flag
    Turn off active detector (also stops timer)
    Read in EVENT TIME and add to MAIN EVENT ACCUMULATED TIME SUM
END  GO to (3)
(No change to MAIN EVENT COUNT since no pulse received.)
(The MAIN EVENT ACCUMULATED TIME SUM reflects total GM tube ON TIME minus time reflected in partial histogram data.)

CALCULATE FIELD STRENGTH (3) Adjust MAIN EVENT COUNT and MAIN EVENT ACCUMULATED TIME SUM using histogram data and mid BIN corrections.
(A)
If enough events have been acquired in the MAIN EVENT COUNT then use that sum along with the MAIN EVENT ACCUM. TIME SUM and ignore the histogram data (GO TO B)
Otherwise, use histogram data to modify the MAIN EVENT COUNT and MAIN EVENT ACCUM. TIME SUM until enough data as determined by signal to noise considerations has been factored into the sums for subsequent calculations.
When adding in histogram data start with HISTOGRAM EVENT COUNT in bin N and work backwards toward HISTOG EVENT COUNT in bin 1. Stop when enough pulse events have been included to provide a FINAL EVENT COUNT equal to the sum of the MAIN EVENT COUNT and the included HISTOGRAM EVENT COUNTS.
(B)
Next, adjust the MAIN EVENT ACCUM. TIME SUM so that zero time corresponds to the earliest HISTOGRAM EVENT COUNT "C" that was used.
For example, if events in bin 4 or more are included, (events in bins 1, 2, and 3 are discarded) then subtract T=3 from the time for each event contributing to the ADJ. ACCUM. TIME SUM.
(If no histogram data is used, set T=N)
ADJ. 1 ACCUM. TIME, SUM = MAIN EVENT AND HISTOGRAM ACCUM. TIME SUM −
(FINAL EVENT COUNT × T)
Next make a midpoint bin correction (best estimate of area) I.E. treat any event with time 0 to 1 as time ½ and so forth for all events at all times.
ADJ. 2 ACCUM. TIME SUM = ADJ. 1 ACCUM. TIME SUM + (FINAL EVENT COUNT × .50)
Next make another .05 bin correction to correct for curvature error which becomes significant at very low mean times close to the clock time.
ADJ. 3 ACCUM. TIME SUM = ADJ 2 ACCUM. TIME SUM − (FINAL EVENT COUNT × .05)
These 3 equations are merged as
FINAL ACCUM. TIME SUM = MAIN EVENT AND HISTOGRAM ACCUM. TIME SUM +
FINAL EVENT COUNT (0.45 − T)
where T = real time from which events are included.
(4) Divide adjusted sums.
RATE 1 = FINAL EVENT COUNT/FINAL ACCUM. TIME SUM
(5) Scale RATE 1 according to HIGH or LOW RANGE scale factors
RATE 2 = RATE 1 × SCALE FACTOR
(6) Filter the rate using adaptive digital filter
The filter changes time constant as a function of:
  (a) number of event counts in present data collection cycle.
  (b) 2 to 3 sigma confidence band of unfiltered RATE (RATE 2 ± error) compared to old filtered RATE (RATE 3 from previous cycle).
RATE 3 = FILTER (RATE 2)
(7) Update RANGE flag (HI ⟷ LOW) for next data collection time.
(use RATE 3 for update

---

In some circumstances it may be desired to selectively vary the minimum number of events utilized for the calculation or to vary the waiting time between data collection time intervals. In such cases the data collection time interval and/or the waiting time may be varied under control of the microprocessor.

Having now described the invention in connection with a particularly illustrated embodiment thereof, variations and modifications of the invention may now naturally occur from time to time to those persons normally skilled in the art without departing from the essential scope or spirit of the invention, and accordingly it is intended to claim the same broadly as well as specifically as indicated by the appended claims.

What is claimed to be new and useful is:

1. Apparatus for measuring radiation field strength comprising in combination,
(a) a biased potential radiation detector having an output circuit, said detector being of the type that is effective when biased to respond to impingement of radiation by generating an output pulse at its output circuit, and when not biased being ineffective to generate an output pulse when impinged by radiation,
(b) biasing means operatively coupled to said radiation detector for selectively biasing said radiation detector to generate an output pulse in response to impingement by radiation, (c) time counting means including timing control means operable to start and terminate time counting, said radiation detector output circuit being operatively coupled to said time counting means and being effective upon generation of an output pulse to cause said time counting means to terminate time counting, (d) actuatable time count storage means operatively coupled to said time counting means and effective when actuated to store the time count registered by said time counting means, (e) a plurality of selectably actuatable event count storage means effective when selectively actuated to register an event count in the selected one of said plurality of event count storage means whenever said radiation detector generates an output pulse, (f) master control means operatively coupled to
  (1) said biasing means to selectively cause said biasing means to bias said radiation detector to respond to impingement by radiation,
  (2) said time counting means and effective to cause said time counting means to start time counting simultaneously with the operative biasing of said radiation detector, said master control means receiving a signal when said radiation detector generates an output pulse.
  (3) said time count storage means and effective to actuate the latter to cause the time count registered by said time counting means to be stored in said time count storage means when said registered time count is equal to or greater than a predetermined value as monitored by said master control means,
  (4) said plurality of event count storage means and effective to cause an event count to be stored in a first selected one of said plurality of event count storage means when the time count registered in said time counting means is stored in said time count storage means, and effective to cause an event count to be stored in a different selected one of said plurality of event count storage means when the time count registered in said time counting means is less than the said predetermined value.

2. Apparatus as described in claim 1 wherein said time count storage means cumulates successive time counts stored therein when successively actuated by said master control means during a pre-set time interval.

3. Apparatus as described in claim 1 wherein all except said first selected one of said plurality of event count storage means represent event counts having a succession of discrete time intervals extending from zero real time to a time just less than said predetermined time count value as measured by said time counting means, and wherein said master control means increments the count in the appropriate event count storage means in accordance with the corresponding time count registered by said time counting means.

4. Apparatus as described in claim 1 wherein all except said first selected one of said plurality of event count storage means represent event counts having a succession of equal increment time intervals extending from zero real time to a time just less than said predetermined time count value as measured by said time counting means, and wherein said master control means increments the count in the appropriate event count storage means in accordance with the corresponding time count registered by said time counting means.

5. Apparatus as described in claim 1 wherein all except said first selected one of said plurality of event count storage means represent event counts having a succession of discrete time intervals extending from zero real time to a time just less than said predetermined time count value as measured by said time counting means, wherein said first selected one of said plurality of event count storage means represents event counts of all time intervals equal to and greater than said predetermined time count value, and wherein said master control means increments the count in the appropriate event count storage means in accordance with the corresponding time count registered by said time counting means.

6. Apparatus as described in claim 1 wherein said time count storage means cumulates successive time counts stored therein when successively actuated by said master control means during a pre-set time interval, wherein all except said first selected one of aaid plurality of event count storage means represent event counts having a succession of discrete time intervals extending from zero real time to a time just less than said predetermined time count value as measured by said time counting means, wherein said first selected one of said plurality of event count storage means represents event counts of all time intervals equal to and greater than said predetermined time count value, and wherein said master control means increments the count in the appropriate event count storage means in accordance with the corresponding time count registered by said time counting means.

7. Apparatus as described in claim 1 wherein said master control means simultaneously causes said time counting means to start counting time and causes said biasing means to bias said radiation detector for response to radiation when a predetermined time has elapsed after said master control means has received a signal in response to generation of an output pulse by said radiation detector.

8. Apparatus as described in claim 1 wherein if after a first time interval said master control means has not received a signal representing the generation of a radiation detector output pulse, said master control means for a second time interval causes said time counting means to terminate time counting and simultaneously causes said biasing means to deactive said radiation detector, and, after termination of said second time interval said master control means causes said biasing means to again bias said radiation detector and simultaneously causes said counting means to start counting.

9. Apparatus as described in claim 1 wherein said master control means after a first time interval causes said time counting means to terminate time counting for a second time interval, and after termination of said second time interval said master control means causes said biasing means to again bias said radiation detector and simultaneously causes said counting means to start counting.

10. The method of measuring radiation field strength including the steps of,
  (a) activating a radiation detector in a radiation field and simultaneously activating a time counting device to count time,
  (b) generating a marker signal in response to a radiation detection event,
  (c) utilizing the marker signal to deactivate the time counting device, (d) repeating steps (a),(b), and (c) continuously for a defined time period, (e) at the end of the defined time period translating the time count registered by the time counting device in accordance with the formula $$\text{RATE} = \frac{\text{EVENT COUNT}}{\text{ACCUM. TIME SUM}} \times S.F.$$

where,

RATE is the radiation field intensity over the defined time period,

EVENT COUNT is the actual number of marker signals utilized in the calculation out of the total number of marker signals generated during the defined time period, ACCUM. TIME SUM is the sum of the times-to-strike corresponding to the marker signals utilized in the EVENT COUNT S.F. is a scale factor which takes into account G-M tube characteristics and clock speed 11. The method as set forth in claim 10 including the further step of disabling the radiation detector for a predetermined length of time after generation of the marker signal.

12. The method as set forth in claim 10 wherein the ACCUM. TIME SUM also includes the time between the last activation of the radiation detector and the end of the defined time period.

13. The method of measuring radiation field strength including the steps of,
   (a) activating a radiation detector in a radiation field and simultaneously activating a time counting device to count time,
   (b) generating a marker signal in response to a radiation detection event, utilizing the marker signal to deactivate the time counting device,
   (d) determining whether the marker signal occurred during a time interval corresponding to one of a plurality of first discrete time intervals extending from zero real time to a predetermined time or occurred during a second time interval after said predetermined time,
   (e) storing the occurrence of the marker signal as an event in one of a plurality of discrete storage means which corresponds to the determined event occurrence time,
   (f) if the marker signal occurred after said predetermined time, cumulatively storing the time count recorded by the time counting device,
   (g) repeating steps (a) through (f) continuously for a defined time period,
   (h) translating the time count registered by the time counting device in accordance with the formula $$\text{RATE} = \frac{\text{EVENT COUNT}}{\text{ACCUM. TIME SUM}} \times S.F.$$

where:

RATE is the radiation field Intensity over the defined time period,

EVENT COUNT is the actual number of marker signals utilized in the calculation out of the total number of marker signals generated during the defined time period, ACCUM. TIME SUM is the sum of the times-to-strike corresponding to the marker signals utilized in the EVENT COUNT S.F. is a scale factor which takes into account G-M tube characteristics and clock speed.

14. The method as set forth in claim 13 further including after each step (c) the step of waiting a pre-set time interval before recommencing step (a).

15. The method as set forth in claim 13 wherein the ACCUM. TIME SUM also includes the time between the last activation of the radiation detector and the end of the defined time period.

16. The method as set forth in claim 13 further including the steps of,
   (a) examining the number of events stored which ocurred during said second time interval after the said predetermined time,
   (b) determining if the number of such stored events is statistically significant, and if significant, discarding the event data which occurred during said plurality of first discrete time intervals and the time data associated therewith.

17. The method as set forth in claim 13 further including the steps of,
   (a) examining the number of events stored which ocurred during said second time interval after the said predetermined time,
   (b) determining if the number of such stored events is statistically significant, and if not significant, successively adding to the EVENT COUNT events which occurred during the said plurality of first discrete time intervals beginning with the events in the discrete time interval immediately preceding said second time interval and adding the events in successively preceding intervals until a statistically significant count has occurred or until all counts have been included, and adding to the ACCUM. TIME SUM the time data associated therewith.

18. The method as set forth in claim 13 further including the step of adjusting the ACCUM. TIME SUM so that,

FINAL ACCUM.TIME SUM=MAIN EVENT ACCUM.TIME SUM+MAIN EVENT COUNT (0.45-T)

where,

MAIN EVENT ACCUM.TIME SUM is the time sum for all events in the MAIN EVENT COUNT MAIN EVENT COUNT is the EVENT COUNT which occurred during the second time interval T is the real time beginning of the second time interval 19. The method as set forth in claim 16 further including the step of adjusting the ACCUM. TIME SUM so that,

FINAL ACCUM.TIME SUM=MAIN EVENT ACCUM.TIME SUM+MAIN EVENT COUNT (0.45-T)

where,

MAIN EVENT ACCUM.TIME SUM is the time sum for all events in the MAIN EVENT COUNT MAIN EVENT COUNT is the EVENT COUNT which occurred during the second time interval T is the real time beginning of the second time interval 20. The method as set forth in claim 17 further including the step of adjusting the ACCUM. TIME SUM so that, FINAL ACCUM.TIME SUM=UT-ILIZED EVENT COUNT TIME SUM+UTILIZED EVENT COUNT (0.45-T)

where,

UTILIZED EVENT COUNT TIME SUM is the time sum for all events utilized, including the event times for all events which occurred during the second time interval and those events included from one or more of said plurality of first discrete time intervals, UTILIZED EVENT COUNT is the EVENT COUNT which occurred during the second time interval and during the included ones of said plurality of first discrete time intervals T is the real time beginning of the earliest to occur of the included ones of said plurality of first discrete time intervals.

* * * * *